July 7, 1959

R. W. ANTHONY 2,893,744

CENTERING CHUCK

Filed Nov. 4, 1957

INVENTOR.
RUSSEL W. ANTHONY
BY Whittemore,
Hulbert & Belknap
Attorneys

United States Patent Office 2,893,744
Patented July 7, 1959

2,893,744
CENTERING CHUCK

Russel W. Anthony, Detroit, Mich., assignor to National Broach & Machine Company, Detroit, Mich., a corporation of Michigan Application November 4, 1957, Serial No. 694,225

7 Claims. (Cl. 279—123)

The present invention relates to a centering chuck.

It is an object of the present invention to provide a power actuated chuck adapted to receive a work piece, to move it axially of the chuck against a seat, thereafter to center the work piece on the seat, and finally to clamp the work piece in accurately centered relation against the seat.

More specifically, it is an object of the present invention to provide a centering chuck including centering and work clamping means, and means for preventing positive clamping of a work piece by the clamping means until the work piece has been centered by the centering means.

It is a further object of the present invention to provide a chuck including axially movable clamp bars having laterally extending clamping heads, cam means operable to effect rotation of the clamp bars upon axial movement thereof to shift the heads into and out of clamping relation, radially movable centering plugs, axially movable wedge bars having wedge surfaces engageable with the centering plugs, a floating piston and cylinder device, and means for connecting the device between the wedge bars and the clamp bars.

It is a further object of the present invention to provide a chuck as described in the preceding paragraph in which spring means are provided to bias the piston and cylinder device in a direction to retract the wedge bars.

Figure 1:
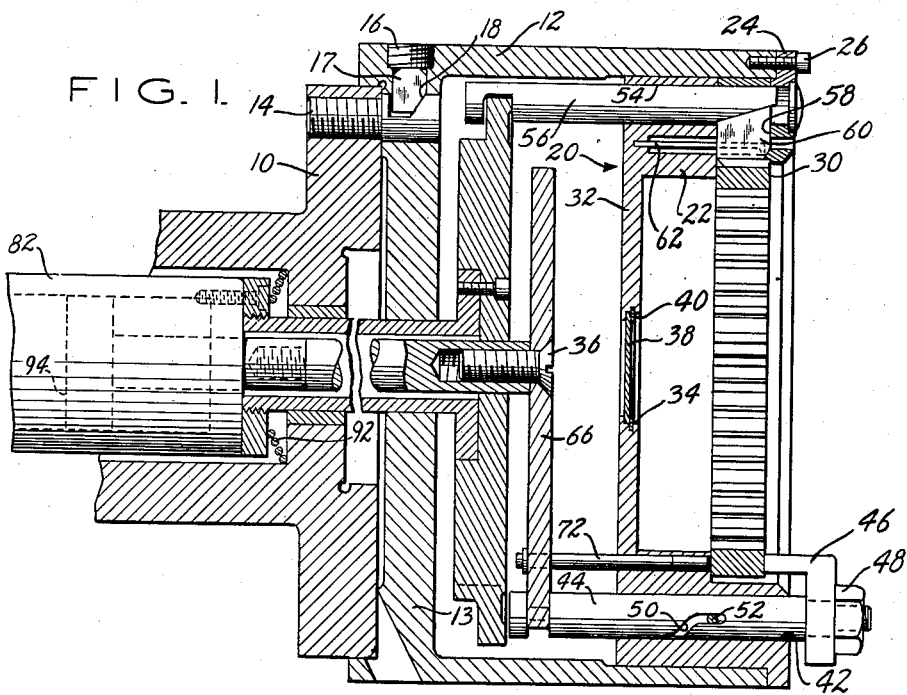
Figure 2:
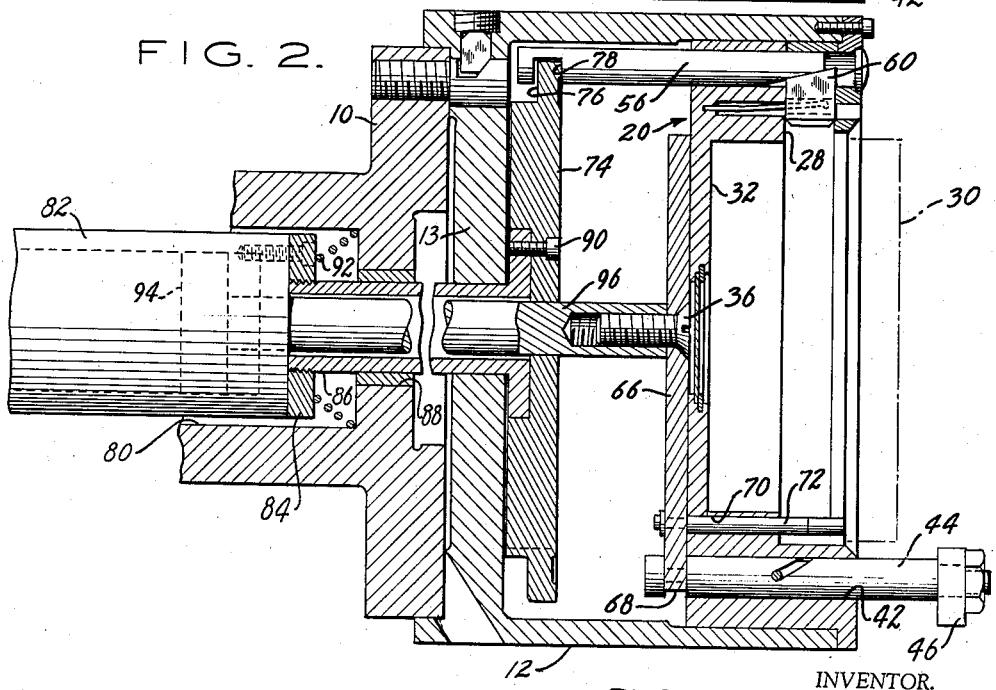

Other objects and features of the invention will become apparent as the description proceeds, especially when taken in conjunction with the accompanying drawing, illustrating a preferred embodiment of the invention, wherein Figures 1 and 2 are axial sections through the chuck showing the parts in clamping and release position respectively.

The chuck is adapted to be attached to the end of a spindle for supporting a work piece for rotation. In the figures the operating parts of the chuck are carried by a member 10 which may be considered as the end of a rotary spindle or as an adapter which may be suitably secured to the end of a spindle. The chuck comprises a cylindrical housing 12 having a transverse inner end wall 13 carried by the member 10 and attached thereto by means of pins 14. The housing 12 includes threaded wedge elements 16 engaging wedge members 17 engageable in recesses 18 formed in the pins 14. Fixedly secured in the housing 12 is a support body 20 including a relatively heavy annular portion 22 provided with a radially outwardly extending flange 24. The support body 20 is secured to the housing 12 by screws 26 extending through openings in the flange 24 and into threaded openings at the forward edge of the annular housing 12. The support body 20 is provided with an accurately formed locating surface 28 best seen in Figure 2, against which the inner edge of a work piece 30 is adapted to seat. The work piece 30 as seen in Figure 1, may be an internal gear the cylindrical outside diameter of which is an accurately formed locating surface.

The support body 20 is also provided with a transverse web 32 apertured as indicated at 34 to provide access to an assembly screw 36 and closed by a plate 38 held in assembled relation by a split ring 40.

The relatively heavy annular portion 22 of the support body 20 is provided with a plurality of axially extending openings 42 which receive cylindrical clamp bars 44. The clamp bars 44, as best seen in Figure 2, have laterally extending clamping heads 46 which are illustrated as secured thereto by nuts 48, and are further provided with grooves or slots 50 in which are engaged control pins 52. The grooves 50 include straight and inclined portions adapted to effect controlled rotation of the bars 44 upon axial movement thereof. The arrangement is such that as the bars are moved to the right, as seen in the figures, to release the work piece the heads 46 are rotated into a clearance position.

In addition, the relatively heavy annular portions 22 of the support body 20 are provided with axially extending openings 54 which are adapted to receive wedge bars 56. The portions 22 are also provided with radially extending openings 58 which receive wedge plugs 60 having inclined outer end portions engageable by correspondingly inclined wedge surfaces on the wedge bars 56. Springs 62 have their inner ends anchored in the support body 20 and their outer ends received in recesses in the plugs 60 to bias the plugs outwardly to the clearance position illustrated in Figure 2 when permitted by the wedge bars 56.

Movably mounted within the chuck inwardly of the support body 20 is a clamping and ejector plate 66 with which the clamp bars 44 are engaged. As illustrated in the figures, the clamp bars 44 include annular recessed portions 68 engaged in peripheral notches in the plate 66, thus providing for rotation of the clamp bars 44 during axial movement thereof as required by the engagement between the pins 52 and slot 50.

The support body 20 is further provided with a plurality of relatively small openings 70 which receive ejector pins 72 engageable with the inner side of the work piece 30 when the clamping and ejector plate 66 is moved to the right as seen in Figure 2. The inner ends of the ejector pins 72 are fixedly secured to the plate 66.

Independently movable within the housing 12 and inwardly of the support body 20 is a locator plate 74 which has a reduced edge portion 76 received in notches 78 formed in the wedge bars 56.

The member 10 includes a hollow portion 80 in which is movably received a cylinder 82, the cylinder including a cylinder head 84 having an extension 86 slidably received in a bushing 88 carried by the member 10. At its forward end the extension 86 is rigidly attached to the locator plate 74 by suitable means such for example as the screws indicated at 90. Located within the hollow portion 80 of the member 10 is a compression spring 92 normally biasing the cylinder 82 to the left as seen in the figures.

Located within the cylinder 82 is a piston 94 having a piston rod 96 extending through the extension 86 and rigidly secured to the ejector plate 66 by the screw 36.

In order to operate the chuck pressure is admitted to the cylinder to the right of the piston 94 as seen in the figures. In Figure 2 the parts are shown in the inoperative position occupied when pressure is admitted to the left of the piston 94. At this time the fluid pressure within the cylinder 82 has moved the cylinder to the left until such movement is arrested by engagement between the locator plate 74 and the transverse wall 13 of the housing 12. This movement of the locator plate 74 results in retraction of the wedge bars 56, releasing the locator plugs 60 for radial outward movement under the influence of biasing spring 62. At the same time, movement of the piston to the right continues until it is arrested by engagement between the clamping and ejector plate 66 and the web 32 of the support body 20. It will be observed in Figure 2 that the ejector pins 72 occupy a position in which they have ejected the work piece 30 from the chuck. Forward movement of the clamp bars 44 has of course released the work piece 30 and has resulted in rotation of the clamping heads 46 to clearance position so that the work piece 30 may be withdrawn from the chuck without interference.

With the parts in the position illustrated in Figure 2 the chuck is ready to receive a work piece and to center, locate and clamp it automatically. The work piece is moved into the chuck but not necessarily into engagement with the seat 28 thereof. At this time fluid is admitted to the cylinder 82 to the right of the piston 94. The spring 92 opposes initial movement of the cylinder and accordingly the first movement is imparted to the piston and through it to the clamping plate 66. Movement of the clamping plate 66 to the left as seen in the figures moves the clamp bars 44 and ejector pins 72 to the left. The ejector pins are retracted a substantial distance inwardly of the seat 28. Inward movement of the clamp bars 44 results in rotation thereof to the operating position shown in Figure 1 and the clamping heads engage the outer edge of the work piece 30 and move it into light pressure contact with the surface 28. The pressure contact is determined at this time essentially by the strength of the spring 92. As soon as the work piece has seated on the surface or seat 28 additional relative movement between the piston and cylinder has the result of moving the cylinder 82 to the right, which movement is transmitted to the wedge bars 56 which in turn cam the locator plugs 60 radially inwardly, thus centering the work piece in the seat 28. It will be understood that until radial inward movement of the centering plugs 60 is arrested, no substantial clamping pressure can be applied to the work piece through the heads 46. However, when the plugs have all moved radially inwardly into firm engagement with the work piece and have accordingly accurately centered the work piece on its seat 28, further movement of the plugs inwardly is prevented, and by the same token further forward movement of the cylinder 82 is likewise prevented. Thereafter, as pressure builds up in the cylinder full clamping pressure is applied to the work piece 30 by the heads 46 to lock the work piece in accurately centered relation on the seat 28.

It will thus be observed that the essential arrangement involves the connection of actuating means between the locating means and the clamping means so that the clamping means cannot be fully effective until the locating means are in firm engagement and have centered the work piece in the chuck. The foregoing arrangement including the spring 90 provides for a controlled sequence of steps in which the work piece is first moved into light pressure contact with the seat so that it may thereafter shift laterally on the seat into a centered position. Thereafter, the work piece is shifted laterally into accurately centered relation and this centering of the work piece is necessarily completed before clamping pressure is applied to the work piece.

The drawing and the foregoing specification constitute a description of the improved centering chuck in such full, clear, concise and exact terms as to enable any person skilled in the art to practice the invention, the scope of which is indicated by the appended claims.

What I claim as my invention is:

1. A locating chuck comprising a locator seat, clamp bars having clamping heads movable into and out of registration with a work piece in said chuck and movable toward and away from said seat, radially movable locator plugs, and power means operable first to move said clamping heads into registration with a work piece on said seat and to move said work piece onto said seat, and operable thereafter to move said plugs radially to center the work piece, and finally to press said work piece firmly against said seat.

2. A locating chuck comprising a locator seat, clamp bars movable axially of said chuck, cam means for rotating said clamp bars as a result of axial movement, laterally extending clamping heads on said bars, radially movable locator plugs, wedge bars associated with said plugs movable axially on said chuck, a floating piston and cylinder device connected between said clamp bars and wedge bars operable to move said clamp bars into engagement with a work piece and then to move said plugs inwardly to center the work piece, and thereafter to apply clamping pressure to the work piece through the heads of said clamp bars.

3. A locating chuck comprising a locator seat, clamp bars movable axially of said chuck, cam means for rotating said clamp bars as a result of axial movement, laterally extending clamping heads on said bars, radially movable locator plugs, wedge bars associated with said plugs movable axially on said chuck, a floating piston and cylinder device connected between said clamp bars and wedge bars operable to move said clamp bars into engagement with a work piece and then to move said plugs inwardly to center the work piece, and thereafter to apply clamping pressure to the work piece through the heads of said clamp bars, and resilient means urging said piston and cylinder device in a direction to cause said clamp bars to operate to engage the work piece and to move it lightly against said seat prior to inward movement of said plugs upon application of clamping pressure to said device.

4. A work locating chuck comprising a support having an annular seat, a set of clamp bars carried by said support for axial movement thereon, work engaging heads on said clamp bars, cam means for rotating said heads into and out of operative position on axial movement thereof, radially movable work centering plugs on said support, a set of axially movable wedge bars on said support having wedge means engageable with said plugs, a cylinder carried by said support for movement axially thereof, a piston movable in said cylinder, means connecting said cylinder and one set of bars and means connecting said piston and the other set of bars.

5. A work locating chuck comprising a support having an annular seat, a set of clamp bars carried by said support for axial movement thereon, work engaging heads on said clamp bars, cam means for rotating said heads into and out of operative position on axial movement thereof, radially movable work centering plugs on said support, a set of axially movable wedge bars on said support having wedge means engageable with said plugs, a cylinder carried by said support for movement axially thereof, a piston movable in said cylinder, means connecting said cylinder and one set of bars and means connecting said piston and the other set of bars, and spring means biasing said cylinder on said support in a direction to move said wedge bars in release direction when pressure is released from said cylinder.

6. A work locating chuck comprising a support having an annular seat, a set of clamp bars carried by said support for axial movement thereon, work engaging heads on said clamp bars, cam means for rotating said heads into and out of operative position on axial movement thereof, radially movable work centering plugs on said support, a set of axially movable wedge bars on said support having wedge means engageable with said plugs, ejector pins carried by said support for movement axially thereof, a cylinder carried by said support for movement axially thereof, a piston movable in said cylinder, means connecting one of said piston and cylinder to said clamp bars and ejector pins and means for connecting the other of said piston and cylinder to said wedge bars.

7. A work locating chuck comprising a support having an annular seat, a set of clamp bars carried by said support for axial movement thereon, work engaging heads on said clamp bars, cam means for rotating said heads into and out of operative position on axial movement thereof, radially movable work centering plugs on said support, and floating actuating means connected between said plugs and said clamp bars to actuate both in unison and hence operable to prevent the application of clamping pressure until locating movement of said plugs is arrested.

References Cited in the file of this patent

UNITED STATES PATENTS

| | | | |
|---|---|---|---|
| 1,844,616 | Whiton | Feb. 9, | 1932 |
| 1,881,905 | Page et al. | Oct. 11, | 1932 |
| 2,733,072 | Hohwart et al. | Jan. 31, | 1956 |
| 2,820,641 | Garrison et al. | Jan. 21, | 1958 |